(12) United States Patent
Lee et al.

(10) Patent No.: US 12,556,772 B2
(45) Date of Patent: *Feb. 17, 2026

(54) COMPUTING NETWORK FOR SYNCHRONIZED STREAMING OF AUDIOVISUAL CONTENT

(71) Applicant: PARAMOUNT PICTURES CORPORATION, Hollywood, CA (US)

(72) Inventors: Eugene M. Lee, Northridge, CA (US); Stephanie Anne Simard, Los Angeles, CA (US); Abraham Chee Shun Wong, Manhattan Beach, CA (US); Alyson Elise Grove, Los Angeles, CA (US)

(73) Assignee: Paramount Pictures Corporation, Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/238,203

(22) Filed: Jun. 13, 2025

(65) Prior Publication Data

US 2025/0310610 A1    Oct. 2, 2025

Related U.S. Application Data

(63) Continuation of application No. 18/813,913, filed on Aug. 23, 2024, now Pat. No. 12,348,823, which is a
(Continued)

(51) Int. Cl.
*H04N 21/4788* (2011.01)
*A63F 13/352* (2014.01)
(Continued)

(52) U.S. Cl.
CPC ....... *H04N 21/4788* (2013.01); *A63F 13/352* (2014.09); *G06F 16/182* (2019.01);
(Continued)

(58) Field of Classification Search
CPC .. H04N 21/4788; H04N 21/00; H04N 21/222; H04N 21/262; H04N 21/26225;
(Continued)

(56) References Cited

U.S. PATENT DOCUMENTS 7,962,948 B1 * 6/2011 Girouard ................ G06Q 30/02
725/86
7,996,566 B1 * 8/2011 Sylvain .................... H04N 7/15
715/201

(Continued)

FOREIGN PATENT DOCUMENTS

CN         1831764 A      9/2006
CN       101150699 A      3/2008
(Continued)

OTHER PUBLICATIONS

Yutaro Takano et al., "A Real Time Communication Service for Audiences in Video Program Simultaneous Watching," IPSJ Symposium Internet and Operational Technology (IOT) 2008, Japan, Dec. 4, 2008, Information Processing Society of Japan, pp. 97-104.
(Continued)

*Primary Examiner* — Nathan J Flynn
*Assistant Examiner* — Christine A Kurien
(74) *Attorney, Agent, or Firm* — Baker & McKenzie LLP

(57) ABSTRACT

Disclosed is a system provides substantially synchronized streaming. The system comprises at least one server operable to communicate, over a network, with client devices connected to the Internet; and provide a media stream to the client devices such that the media stream is displayed, in a substantially synchronized manner, on display screens of the client devices.

30 Claims, 7 Drawing Sheets

Related U.S. Application Data continuation of application No. 18/508,152, filed on Nov. 13, 2023, now Pat. No. 12,075,130, which is a continuation of application No. 17/888,425, filed on Aug. 15, 2022, now Pat. No. 11,818,417, which is a continuation of application No. 15/290,218, filed on Oct. 11, 2016, now Pat. No. 11,418,845, which is a continuation of application No. 14/665,693, filed on Mar. 23, 2015, now Pat. No. 9,674,239, which is a continuation of application No. 13/756,444, filed on Jan. 31, 2013, now Pat. No. 8,990,303.

(51) Int. Cl.

| | | |
|---|---|---|
| *G06F 16/182* | (2019.01) | |
| *G06F 16/60* | (2019.01) | |
| *G06F 16/70* | (2019.01) | |
| *G06F 21/10* | (2013.01) | |
| *H04L 9/40* | (2022.01) | |
| *H04L 51/04* | (2022.01) | |
| *H04L 51/52* | (2022.01) | |
| *H04L 65/403* | (2022.01) | |
| *H04L 65/60* | (2022.01) | |
| *H04L 67/02* | (2022.01) | |
| *H04L 67/131* | (2022.01) | |
| *H04L 67/306* | (2022.01) | |
| *H04L 67/60* | (2022.01) | |
| *H04N 21/00* | (2011.01) | |
| *H04N 21/222* | (2011.01) | |
| *H04N 21/262* | (2011.01) | |
| *H04N 21/414* | (2011.01) | |
| *H04N 21/43* | (2011.01) | |
| *H04N 21/472* | (2011.01) | |
| *H04N 21/478* | (2011.01) | |
| *H04N 21/81* | (2011.01) | |
| *G06Q 50/00* | (2012.01) | |
| *H04L 65/611* | (2022.01) | |

(52) U.S. Cl.
CPC .......... *G06F 16/60* (2019.01); *G06F 16/70* (2019.01); *G06F 21/10* (2013.01); *H04L 51/04* (2013.01); *H04L 51/52* (2022.05); *H04L 63/10* (2013.01); *H04L 65/403* (2013.01); *H04L 65/60* (2013.01); *H04L 67/02* (2013.01); *H04L 67/131* (2022.05); *H04L 67/306* (2013.01); *H04L 67/60* (2022.05); *H04N 21/00* (2013.01); *H04N 21/222* (2013.01); *H04N 21/262* (2013.01); *H04N 21/26225* (2013.01); *H04N 21/26241* (2013.01); *H04N 21/41407* (2013.01); *H04N 21/43076* (2020.08); *H04N 21/47202* (2013.01); *H04N 21/47217* (2013.01); *H04N 21/4781* (2013.01); *H04N 21/8126* (2013.01); *G06Q 50/01* (2013.01); *H04L 65/611* (2022.05)

(58) Field of Classification Search
CPC ....... H04N 21/26241; H04N 21/41407; H04N 21/43076; H04N 21/47202; H04N 21/47217; H04N 21/4781; H04N 21/8126; A63F 13/352; G06F 16/182; G06F 16/60; G06F 16/70; G06F 21/10; H04L 51/04; H04L 51/52; H04L 63/10; H04L 65/403; H04L 65/60; H04L 67/02; H04L 67/131; H04L 67/306; H04L 67/60; H04L 65/611; G06Q 50/01
See application file for complete search history.

(56) References Cited

U.S. PATENT DOCUMENTS

| | | | |
|---|---|---|---|
| 8,010,690 B2 | 8/2011 | Finger et al. | |
| 8,910,208 B2 | 12/2014 | Hartman et al. | |
| 8,990,303 B2 | 3/2015 | Wong et al. | |
| 9,129,087 B2 | 9/2015 | Grab et al. | |
| 9,426,530 B2* | 8/2016 | Logan | H04N 21/6405 |
| 9,432,746 B2 | 8/2016 | Spears | |
| 9,674,239 B2 | 6/2017 | Wong et al. | |
| 10,021,429 B1 | 7/2018 | Talvensaari et al. | |
| 10,334,329 B2 | 6/2019 | Spears | |
| 2003/0078972 A1 | 4/2003 | Tappissier et al. | |
| 2004/0055014 A1* | 3/2004 | Edelson | H04N 21/8586 725/110 |
| 2006/0190966 A1 | 8/2006 | McKissick et al. | |
| 2006/0230415 A1 | 10/2006 | Roeding | |
| 2007/0037599 A1 | 2/2007 | Tillet et al. | |
| 2007/0255785 A1 | 11/2007 | Hayashi et al. | |
| 2007/0283403 A1 | 12/2007 | Eklund, II et al. | |
| 2008/0034040 A1 | 2/2008 | Wherry et al. | |
| 2008/0081700 A1 | 4/2008 | Biniak et al. | |
| 2008/0141378 A1 | 6/2008 | Mclean | |
| 2009/0080635 A1 | 3/2009 | Altberg et al. | |
| 2009/0094656 A1 | 4/2009 | Carlucci | |
| 2009/0150553 A1 | 6/2009 | Collart et al. | |
| 2009/0183220 A1 | 7/2009 | Amento et al. | |
| 2009/0217329 A1 | 8/2009 | Riedl et al. | |
| 2009/0249222 A1* | 10/2009 | Schmidt | H04N 21/4143 713/400 |
| 2009/0271524 A1 | 10/2009 | Davi et al. | |
| 2009/0276805 A1* | 11/2009 | Andrews, II | G06Q 30/02 725/38 |
| 2009/0328120 A1 | 12/2009 | Finger et al. | |
| 2010/0034510 A1 | 2/2010 | Oda et al. | |
| 2010/0162324 A1 | 6/2010 | Mehta et al. | |
| 2010/0174783 A1 | 7/2010 | Zarom | |
| 2010/0208082 A1 | 8/2010 | Buchner et al. | |
| 2010/0306655 A1 | 12/2010 | Mattingly et al. | |
| 2010/0306671 A1 | 12/2010 | Mattingly et al. | |
| 2011/0063317 A1 | 3/2011 | Gharaat et al. | |
| 2011/0072366 A1 | 3/2011 | Spencer et al. | |
| 2011/0145881 A1 | 6/2011 | Hartman et al. | |
| 2011/0161834 A1* | 6/2011 | Shadfar | H04L 67/131 715/753 |
| 2011/0195790 A1 | 8/2011 | Konkle | |
| 2011/0197237 A1 | 8/2011 | Turner | |
| 2011/0197238 A1 | 8/2011 | Li et al. | |
| 2011/0214144 A1 | 9/2011 | Girouard et al. | |
| 2012/0096121 A1 | 4/2012 | Hao et al. | |
| 2012/0124486 A1 | 5/2012 | Robinson et al. | |
| 2012/0131609 A1 | 5/2012 | Gutierrez et al. | |
| 2012/0159337 A1 | 6/2012 | Travilla et al. | |
| 2012/0215684 A1 | 8/2012 | Kidron | |
| 2012/0232954 A1 | 9/2012 | Calman et al. | |
| 2012/0272162 A1 | 10/2012 | Surin et al. | |
| 2013/0091214 A1 | 4/2013 | Kellerman et al. | |
| 2013/0117468 A1 | 5/2013 | Ibasco et al. | |
| 2013/0133000 A1 | 5/2013 | Kelley | |
| 2013/0339159 A1 | 12/2013 | Shaikh et al. | |
| 2013/0347017 A1* | 12/2013 | Li | H04N 21/4126 725/18 |
| 2014/0033265 A1 | 1/2014 | Leeds et al. | |
| 2014/0214920 A1 | 7/2014 | Wong et al. | |
| 2014/0298373 A1 | 10/2014 | Jing et al. | |
| 2015/0215352 A1 | 7/2015 | Wong et al. | |
| 2015/0304605 A1* | 10/2015 | Hartman | H04N 7/15 725/109 |
| 2016/0014477 A1 | 1/2016 | Siders | |
| 2016/0182971 A1 | 6/2016 | Ortiz et al. | |
| 2017/0034229 A1 | 2/2017 | Wong et al. | |
| 2017/0238058 A1 | 8/2017 | Wong et al. | |

FOREIGN PATENT DOCUMENTS

| | | |
|---|---|---|
| CN | 101572794 A | 11/2009 |
| CN | 101897185 A | 11/2010 |

(56) References Cited

FOREIGN PATENT DOCUMENTS

| | | | |
|---|---|---|---|
| JP | 2005244605 A | 9/2005 | |
| JP | 2008172745 A | 7/2008 | |
| JP | 2009141952 A | 6/2009 | |
| JP | 2009530923 A | 8/2009 | |
| JP | 2011501260 A | 1/2011 | |
| JP | 2011520302 A | 7/2011 | |
| JP | 2013530635 A | 7/2013 | |
| KR | 1020080113069 B1 | 12/2008 | |
| KR | 2013530635 B1 | 12/2012 | |
| RU | 2009126606 A | 1/2011 | |
| WO | 2007133847 A2 | 11/2007 | |

OTHER PUBLICATIONS

Ikeda, Junya, et al.; "SNS-Based System for Supporting Simultaneous Video Watching among Remote Users;" information Processing Society of Japan; IPSJ SIG Technical Report, vol. 2012-DPS-151, No. 14; May 21, 2012; 6 pages.
View of Hulu on Xbox 360, http://www.hulu.com/ and http://www.hulu.com/watch/452934/, (2013), 1 page.
View of Facebook, https://www.facebook.com/ and http://www.facebook.com/photo.php?v=10151014642773737&set=vb.6920564369&type=3&theater/, (2013), 1 page.
View of Linkedin, http://www.linkedin.com/nhome/, (2013), 1 page.
View of SoundCloud, https://soundcloud.com/, (2013), 1 page.
View of Twitter, https://twitter.com/, (2013), 1 page.
View of Microsoft Silverlight, http://www.microsoft.com/silverlight/, (2013), 1 page.
View of Cisco WebEx Meeting Center, 2013, 1 page.
View of NetFlix, https://signup.netflix.com/Login and http://movies.netflix.com/WiMovie/Ferris_Bueller_s_Day_Off/498716?trkid=2361337, 2013, 1 page.
View of Skype, http://www.skype.com/, 2013, 1 page.
View of Paramount Movies, http://www.paramountmovies.com/ and http://www.paramountmovies.com/startrek2009.html/, (2013), 1 page.
View of Google+, https://plus.google.com/, (2013), 1 page.
View of Pinterest, http://pinterest.com/ and http:/ipinterest.com/pin/77616793548180990/, (2013), 1 page.
View of YouTube, http://www.youtube.com/ and http://www.youtube/watch?v=LqldwoDXHKg/, (2013), 1 page.
View of Amazon, http://www.amazon.com/ and http://Www.amazon.com/Star-Trek/dp/B002PMPTIO/ref=sr_ 1_ 1?e=UTF8&qid=1360801599&sr=8-1&keywords=star+trek/, (2013), 1 page.
View of EPIX Private Screen Room home page, (2013), 4 pages.
OoVoo update lets you and a party of 11 watch YouTube together, http://www.engadget.com/2013/01/08/oovoo-watch-together/, (Jan. 8, 2013), 2 pages.
View of Paramount Movies Ultraviolet Movie Redemption, Purchases, Movie Playback, My Movies, http://www.paramountmovies.com/index.html?pageId=171 [Jan. 14, 2013 11:04:34 am]/, (2013), 6 pages.
View of NBC, http://www.nbc.com/ and http://www.nbc.com/saturday-night-live/video/february-9-justin-biever/n32607/, 2013, 1 page.
View of Hulu, http://www.hulu.com/watch/458709, Mar. 20, 2013, 4 pages.
EPIX Press Releases, "EPIX Introduces First Interactive Social Viewing Experience of Feature-Length Films Through Partnership with ClipSync," downloaded from http://epixnews.tumblr.com/post/265124966/epix-introduces-first-interactive-social-viewing/, (Mar. 26, 2013), 3 pages.
Notice of Non-Final Rejection, U.S. Appl. No. 13/756,444 dated May 15, 2013, 9 pages.
Notice of Final Rejection, U.S. Appl. No. 13/756,444 dated Dec. 6, 2013, 9 pages.
International Search Report and Written Opinion, PCT/US2014/013646, dated May 15, 2014, 12 pages.
Notice of Non-Final Rejection, U.S. Appl. No. 13/756,444 dated Jun. 25, 2014, 10 pages.
Notice of Allowance, U.S. Appl. No. 13/756,444 dated Jan. 9, 2015, 7 pages.
Notice of Non-Final Rejection, U.S. Appl. No. 14/665,693 dated Oct. 4, 2016, 12 pages.
Inside West Yasuhito Innovation and Utilization of Yasuto Nakanishi and Interaction Technology Interaction Technologies—Research and Practical Aspects, Journal of the Information Processing Society of Japan 43rd vol. No. 12 IPSJ Journal, Japan, Dec. 15, 2016, vol. 43, pp. 3550 to 3558, 15 pages.
Notice of Allowance, U.S. Appl. No. 14/665,693 dated Jan. 30, 2017, 5 pages.
Office Action and Search Report dated Oct. 3, 2017 for Russian Application No. 2015132204, 6 pages.
Notice of Non-Final Rejection, U.S. Appl. No. 15/290,218 dated Jan. 11, 2018, 16 pages.
Notice of Reasons for Rejection for Japanese Application No. 2015-556108 dated Jan. 31, 2018; 10 pages.
Pereira, Mafalda; Communication Pursuant to Article 94(3) EPC for European Application No. 14 745 731.1; Apr. 20, 2018; 5 pages.
Office Action dated Jul. 26, 2018 in connection with Chinese Application No. 201480017707.1, 18 pages.
Notice of Final Rejection, U.S. Appl. No. 15/290,218 dated Aug. 7, 2018, 16 pages.
Notice of Non-Final Rejection, U.S. Appl. No. 15/290,218 dated Nov. 30, 2018, 20 pages.
Office Action dated Mar. 18, 2019 in connection with South Korean Application No. 10-2018-7034206, 20 pages.
Office Action dated May 8, 2019 in connection with Chinese Application No. 201480017707.1, 34 pages.
Notice of Final Rejection, U.S. Appl. No. 15/290,218 dated May 31, 2019, 23 pages.
Office Action dated Jul. 24, 2019 in connection with Japanese Application No. 2018-123512.
Office Action dated Oct. 9, 2019 in connection with Chinese Application No. 201480017707.1.
Office Action dated Oct. 28, 2019 in connection with Korean Application No. 10-2018-7034206.
Notice of Non-Final Rejection, U.S. Appl. No. 15/290,218 dated Dec. 31, 2019, 21 pages.
Office Action dated Feb. 20, 2020 in connection with Brazil Application No. BR112015018366-2, 4 pages.
Office Action dated Apr. 2, 2020 in connection with European Application No. EP14745731.1, 5 pages.
Decision for Grant, granted on Apr. 20, 2020 in connection with Japanese Application No. JP2018-123512 (JP Patent No. 6693678), 1 page.
Office Action dated May 7, 2020 in connection with Australian Application No. 2018201962, 4 pages.
Notice of Final Rejection, U.S. Appl. No. 15/290,218 dated Jun. 24, 2020, 23 pages.
Office Action dated Jul. 6, 2020 in connection with Korean Application No. 10-2020-7008834, 12 pages.
Office Action dated Jul. 30, 2020 in connection with Indian Application No. 6910/DELNP/2015, 7 pages.
Notice of Non-Final Rejection, U.S. Appl. No. 15/290,218 dated Nov. 27, 2020, 24 pages.
Notice of Allowance dated Jan. 25, 2021 in connection with Korean Application No. 10-2020-7008834, 6 pages.
Office Action dated Jun. 1, 2021 in connection with Japanese Application No. 2020-072113.
Notice of Final Rejection, U.S. Appl. No. 15/290,218 dated Jun. 15, 2021, 26 pages.
Office Action dated Aug. 5, 2021 in connection with Korean Application No. 10-2020-7008834.
Office Action dated Aug. 5, 2021 in connection with Korean Application No. 10-2021-7012490, 18 pages.
Communication pursuant to Article 94(3) EPC dated Oct. 4, 2021 in connection with European Application No. 14745731.1, 5 pages.
Notice of Non-Final Rejection, U.S. Appl. No. 15/290,218 dated Oct. 27, 2021, 27 pages.

(56) References Cited

OTHER PUBLICATIONS

Notice of Reasons for Refusal dated Dec. 21, 2021 in connection with JP2020-072113, 6 pages.
Office Action dated Feb. 17, 2022 in connection with Korean Application No. 10-2021-7012490, 18 pages.
Notice of Allowance, U.S. Appl. No. 15/290,218 dated Mar. 14, 2022, 8 pages.
First Office Action dated Jun. 6, 2022 in connection with Chinese Application No. 202011262788.5, 8 pages.
Decision for Grant, granted on Aug. 8, 2022 in connection with Japanese Application No. JP2020-072113 (JP Patent No. 7121067), 1 page.
Final Office Action dated Sep. 26, 2022 in connection with Korean Application No. 10-2021-7012490, 6 pages.
Notice of Non-Final Rejection, U.S. Appl. No. 17/888,425 dated Nov. 4, 2022; 9 pages.
Notice of Allowance dated Jan. 25, 2023 in connection with Korean Application No. 10-2021-7012490, 8 pages.
English translation of Second Office Action dated Feb. 18, 2023 in connection with Chinese Application No. 202011262788.5, 6 pages.
Notice of Final Rejection, U.S. Appl. No. 17/888,425 dated Mar. 2, 2023; 10 pages.
Notice of Allowance, U.S. Appl. No. 17/888,425 dated Jun. 30, 2023; 7 pages.
Office Action dated Jul. 11, 2023 in connection with Japanese Application No. 2022-125077, 5 pages.
Office Action dated Aug. 10, 2023 in connection with Chinese Application No. 202011262788.5, 37 pages.
Notice of Allowance, U.S. Appl. No. 17/888,425 dated Sep. 8, 2023; 2 pages.
Notice of Allowance, U.S. Appl. No. 17/888,425 dated Oct. 17, 2023; 2 pages.
Office Action dated Oct. 21, 2023 in connection with Korean Application No. 10-2023-7014102, 4 pages.
Non Final Notice of Reasons for Rejection dated Dec. 26, 2023 in connection with Japanese Application No. 2022-125077, 20 pages.
European Patent Office, European Search Report for EP 4303741, dated Jan. 31, 2024.
Notice of Allowance, U.S. Appl. No. 18/508,152 dated Feb. 12, 2024; 8 pages.
Notice of Reasons for Rejection for Japanese Application No. 2022-125077 dated Jul. 2, 2024; 7 pages.
Intention to Grant issued in European Application No. 23212630.0 dated Oct. 23, 2024, 8 pages.
Decision of Refusal, Japanese Application No. 2022-125077 dated Jan. 21, 2025, 6 pages.

\* cited by examiner

COMPUTING NETWORK FOR SYNCHRONIZED STREAMING OF AUDIOVISUAL CONTENT

TECHNICAL FIELD

The present disclosure relates generally to synchronized streaming of audiovisual content.

BACKGROUND

There is a need for improved streaming of audiovisual content.

SUMMARY

In some embodiments, a system provides substantially synchronized streaming. The system comprises at least one server, in communication with a user profile database, and operable to: communicate, over a network, with client devices connected to the Internet; provide a media stream to the client devices such that the media stream is displayed, in a substantially synchronized manner, on display screens of the client devices, wherein the client devices comprise at least one mobile device; enable a first user to share a link associated with the substantially synchronized playback of the media stream, wherein the sharing of the link enables other users associated with the client devices to join the substantially synchronized playback of the media stream, wherein the sharing of the link occurs during when the first user is receiving the media stream; enable users associated with the client devices to interact via the client devices such that user interactions are exchanged using the client devices simultaneously with display of the media stream on the display screens of the client devices, and such that the user interactions are displayed simultaneously with the media stream on the display screens of the client devices; and receive user playback controls from the first user to control the substantially synchronized playback of the media stream, wherein the first user is enabled to pass the control of the substantially synchronized playback of the media stream to a second user, wherein the media stream comprises video content, wherein an ancillary content server, different from the at least one server, provides ancillary content for transmission to the client devices, and wherein the ancillary content is presented on the client devices, simultaneously with the media stream.

In some embodiments, a system comprises: at least one server, in communication with a user profile database, and operable to: communicate, over a network, with one or more client devices connected to Internet; enable a first user to share a link associated with substantially synchronized streaming of a media stream, wherein the sharing of the link enables one or more users associated with the one or more client devices to join the substantially synchronized streaming of the media stream, wherein the sharing of the link occurs during when a second user is receiving the media stream; provide or transmit the media stream to the one or more client devices such that the media stream is displayed, in a substantially synchronized manner, on one or more display screens of the one or more client devices; enable the one or more users associated with the one or more client devices to interact using the one or more client devices such that user interactions are exchanged using the one or more client devices substantially simultaneously with display of the media stream on the one or more display screens of the one or more client devices, and such that the user interactions are displayed substantially simultaneously with the media stream on the one or more display screens of the one or more client devices; enable the second user to add a visual indicator on or to the media stream or in the user interactions such that the visual indicator added on or to the media stream or added in the user interactions is viewable by the one or more users associated with the one or more client devices; receive a first instruction from the first user to assign to or share with the second user, a first control: of the substantially synchronized streaming of the media stream, or of the user interactions displayed substantially simultaneously with the media stream; in response to receiving the first instruction from the first user to assign to or share with the second user, the first control: of the substantially synchronized streaming of the media stream, or of the user interactions displayed substantially simultaneously with the media stream, enable the second user to control: the substantially synchronized streaming of the media stream for a third user receiving the media stream, or the user interactions displayed substantially simultaneously with the media stream to the third user receiving the media stream; and receive a second instruction from the second user to modify the substantially synchronized streaming of the media stream or the user interactions displayed substantially simultaneously with the media stream, thereby causing the substantially synchronized streaming of the media stream, or the user interactions displayed substantially simultaneously with the media stream, to be modified for the third user, wherein an ancillary content server or the at least one server provides ancillary content to a first client device, and wherein the ancillary content is presented on the first client device.

In some embodiments, a method comprises: communicating, by at least one server, over a network, with one or more client devices connected to Internet; enabling, by the at least one server, a first user to share a link associated with substantially synchronized streaming of media content, wherein the link enables one or more users associated with the one or more client devices to join substantially synchronized streaming of the media content, wherein the sharing of the link occurs during when a second user is receiving the media content; providing or transmitting, by the at least one server, the media content to the one or more client devices such that the media content is displayed, in a substantially synchronized manner, on one or more display screens of the one or more client devices; enabling, by the at least one server, the one or more users associated with the one or more client devices to interact using the one or more client devices such that user interactions are exchanged using the one or more client devices substantially simultaneously with display of the media content on the one or more display screens of the one or more client devices, and such that the user interactions are displayed substantially simultaneously with the media content on the one or more display screens of the one or more client devices; enabling, by the at least one server, the second user to add a visual indicator on or to the media content or in the user interactions such that the visual indicator added on or to the media content or added in the user interactions is viewable by the one or more users associated with the one or more client devices; receiving, by the at least one server, a first instruction to assign to or share with the second user, a first control: of the substantially synchronized streaming of the media content, or of the user interactions displayed substantially simultaneously with the media content; in response to receiving the first instruction to assign to or share with the second user, the first control: of the substantially synchronized streaming of the media content, or of the user interactions displayed substantially simultaneously with the media content, enabling, by the at least one server, the second user to control: the substantially synchronized streaming of the media content for a third user receiving the media content, or the user interactions displayed substantially simultaneously with the media content to the third user receiving the media content; and receiving, by the at least one server, a second instruction from the second user to modify the substantially synchronized streaming of the media content or the user interactions displayed substantially simultaneously with the media content, thereby causing the substantially synchronized streaming of the media content, or the user interactions displayed substantially simultaneously with the media content, to be modified for the third user, wherein an ancillary content server or the at least one server provides ancillary content for transmission to a first client device, and wherein the ancillary content is presented on the first client device.

In some embodiments, one or more systems further comprise: means for communicating, over a network, with one or more mobile client devices; means for enabling a first user to share a link associated with substantially synchronized streaming of a media stream, wherein the link enables one or more users associated with the one or more mobile client devices to join the substantially synchronized streaming of the media stream, wherein the sharing of the link occurs during when a second user is receiving the media stream; means for providing or transmitting the media stream to the one or more mobile client devices such that the media stream is displayed, in a substantially synchronized manner, on one or more display screens of the one or more mobile client devices; means for enabling the one or more users associated with the one or more mobile client devices to interact using the one or more mobile client devices such that user interactions are exchanged using the one or more mobile client devices substantially simultaneously with display of the media stream on the one or more display screens of the one or more mobile client devices, and such that the user interactions are displayed substantially simultaneously with the media stream on the one or more display screens of the one or more mobile client devices; means for enabling the second user to add a visual indicator on or to the media stream or in the user interactions such that the visual indicator added on or to the media stream or added in the user interactions is viewable by the one or more users associated with the one or more mobile client devices; means for receiving a first instruction to assign to or share with the second user, a first control: of the substantially synchronized streaming of the media stream, or of the user interactions displayed substantially simultaneously with the media stream; in response to receiving the first instruction to assign to or share with the second user, the first control: of the substantially synchronized streaming of the media stream, or of the user interactions displayed substantially simultaneously with the media stream, means for enabling the second user to control: the substantially synchronized streaming of the media stream for a third user receiving the media stream, or the user interactions displayed substantially simultaneously with the media stream to the third user receiving the media stream; means for receiving a second instruction from the second user to manipulate the substantially synchronized streaming of the media stream or the user interactions displayed substantially simultaneously with the media stream, thereby causing the substantially synchronized streaming of the media stream, or the user interactions displayed substantially simultaneously with the media stream, to be manipulated for the third user; and means for providing ancillary content to a first client device such that the ancillary content is displayed on the first client device.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements for convenience, it should be appreciated that each of the various example embodiments may be considered to be distinct variations.

DETAILED DESCRIPTION

Figure 1:
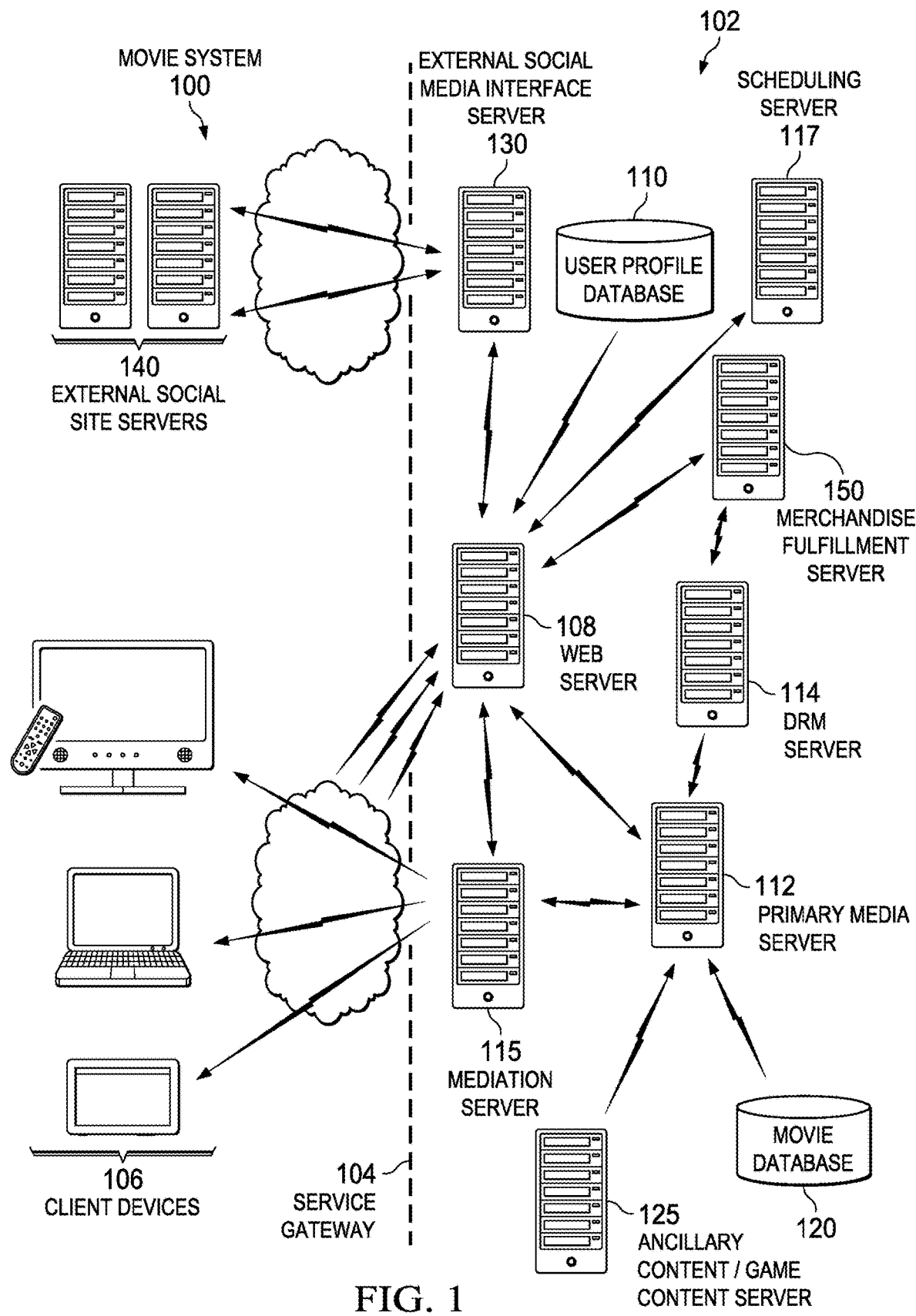
FIG. 1 is an architectural diagram of an exemplary embodiment of a system for interactive remote movie watching, scheduling, and social connection.

In some embodiments, a system provides substantially synchronized streaming. The system comprises at least one server, in communication with a user profile database, and operable to: communicate, over a network, with client devices connected to the Internet; provide a media stream to the client devices such that the media stream is displayed, in a substantially synchronized manner, on display screens of the client devices, wherein the client devices comprise at least one mobile device; enable a first user to share a link associated with the substantially synchronized playback of the media stream, wherein the sharing of the link enables other users associated with the client devices to join the substantially synchronized playback of the media stream, wherein the sharing of the link occurs during when the first user is receiving the media stream; enable users associated with the client devices to interact via the client devices such that user interactions are exchanged using the client devices simultaneously with display of the media stream on the display screens of the client devices, and such that the user interactions are displayed simultaneously with the media stream on the display screens of the client devices; and receive user playback controls from the first user to control the substantially synchronized playback of the media stream, wherein the first user is enabled to pass the control of the substantially synchronized playback of the media stream to a second user, wherein the media stream comprises video content, wherein an ancillary content server, different from the at least one server, provides ancillary content for transmission to the client devices, and wherein the ancillary content is presented on the client devices, simultaneously with the media stream.

In the context of providing for an interactive movie experience, it is desired for multiple friends or family to participate together in a movie watching experience and to accordingly socially engage in real-time and contextually with the movie. Such interactions are ideally made in-time with the scenes appearing in the movie. In sum, none of the prior systems replicate, across the internet, the personal experience of watching a movie together with friends and loved ones.

The presently described embodiments provide for the purchasing of licensed media content, such as movies and songs, and the digital rights management tools for managing the number of playbacks and/or group purchases encompassing multiple users, viewers, and purchasers for the licensed media content. The described embodiments further provide for group scheduling of common watching times for the licensed media content and for the sharing of comments as the movie occurs and in the context of the movie viewing itself. Further, the described embodiments allow for time-indexing of the movie such that the real-time comments around the movie-watching experience can be shared and recorded in the context of the movie watching experience so that a friend who is in the viewer's social group or family can later watch a recorded version of a movie and see the contextual social commentary provided by the later viewer's friend and/or family.

In other words, the disclosed systems and methods provide for synchronization of recorded media delivery to multiple parties while providing for contextual social chat about the media delivery. The described embodiments include technology to keep any synchronized video stream to a watching party from getting too far ahead or too far behind. This synchronization can be provided, for example, by providing a feedback loop through internet communications from the receiving clients' media players back to servers operating on the main system, slowing down or speeding up one or more media streams to provide for simultaneous delivery of the same media context, and indexing of the media stream itself can be used to help confirm the relative synchronicity. The described systems further are operable to use the time encoding for tie-in trivia and voting games related to favorite movie scenes and characters. This and other second-screen content can be provided to play along in real time with a movie for a more engaging interactive experience in addition to the previously discussed features.

Generally speaking, the described systems provide for a shared experiencing of licensed media content such as movies or proprietary live video streams. Such systems can include a web server that communicates with multiple client devices over the internet whereby a user's multiple social contacts can participate in a synchronized stream of licensed media content such as movies. The system is able to schedule the multi-user experiencing of the licensed media content and further synchronize the streaming of the licensed content so the participating users receiving the media streams in a substantially synchronized manner. The system still further provides for social content interaction amongst the multiple recipients so that the multiple users can interact in a time-contextual manner consistent with the substantially synchronized receipt of the licensed media content.

Illustrated in FIG. 1 is an architecture of an exemplary embodiment of a system 100 for interactive remote movie watching, scheduling, and social connection. In the illustrated embodiment, various exemplary servers, client machines, and external services are illustrated for such an interactive system 100. The system elements for an exemplary service provider 102 configuration are provided behind a service gateway 104, which serves as the firewall and/or external connection from the service provider 102 to the "cloud" internet connection(s) shown in the figure. It should be appreciated that the connections through the service gateway can comprise one or more physical network connections via one or multiple servers (e.g., web server(s) 108 and mediation server(s) 115, described further below) and that multiple virtual tunnels can be formed through these one or multiple physical network connections.

In the illustrated embodiment, it should be appreciated that the "service provider" 102 may comprise multiple related/interconnected systems and subsystems, which could be administrated through one or more business partnerships or vendor relationships, but a single connected system is illustrated in the present embodiment for ease of understanding. In the illustrated embodiment, web server(s) 108 generally provide for the top-level interaction with the various client devices 106. The web server 108 accordingly communicates with the client devices 106 to provide for user logins through their client devices, to keep track of and update user profiles or information about user preferences, as well as to facilitate purchase of licensed media content and/or physical merchandise.

Still referring to FIG. 1, the user's preferences, purchases, and the like are stored via the web server 108 into the user profile database 110. While the embodiment illustrated in the figure shows the user profile database 110 directly connected to the web server 108, it should be appreciated that there could be database servers or other intermediate servers interposed between the web server 108 and the user profile database 110. Also provided in the illustrated embodiment is a merchant fulfillment server 150, which is in communication with the web server 108 and is operable to facilitate user payments for purchased content, such as online media content and/or physical merchandise to be shipped via traditional ground shipping. The merchant fulfillment server 150 would be used, when the user purchases content, to process the credit card payment, PayPal payment, or payment from another payment system.

Once a purchase is approved, the system proceeds to "license" the media for online distribution to the user or to process physical goods for shipment. As to the licensing of the media for online delivery, the merchandise fulfillment server 150 connects directly or indirectly to the digital rights management (DRM) server 114, which using secure cryptography means is operable to "unlock" delivery of media from the primary media server 112, which in turn accesses and streams or facilitates the streaming of the unlocked media content that is stored on the movie or other media database 120.

It should be appreciated also that the fulfillment server 150, DRM server 114, and web server 108 would remain in communication with each to ensure that the proper licensing rights are synchronized and recorded in the user profile database 110. It should be further appreciated that licensed media content includes media content for which digital rights are intended to be maintained, and that multiple technologies exist for protecting the proprietary rights in streams of such media, including watermarking and various types of digital rights management (DRM). Currently known commercial implementations of such technologies for protecting licensed media content include Digital Entertainment Content Ecosystem's "Ultra Violet" (see www.uvvu.com) and Microsoft's "Silverlight". These techniques and other techniques according to design choice are appreciated to be operable to create licensed media content as described in the present application.

As to the primary media server 112 shown in FIG. 1, while this may be provided by a traditional server machine (computer), as with other servers and computing machines described herein, the described server might be a collection of servers or distributed servers or the like. Such collections of servers might be content delivery networks or CDNs, such as are provided by companies like Akamai. These types of networks provide for or facilitate the streaming and multicasting of media content over the internet. Such CDNs include not only distributed computing machinery but also storage for buffering the content being delivered.

Also provided in FIG. 1 is an ancillary content/game content server 125. This ancillary content could include second screen content that would be available to users in parallel to the media content being played. The "Scene It?" franchise could be one possible implementation of this ancillary content. With further regard to the second screen content, this additional content can be delivered in a different window on the viewing clients 106, or separate clients 106 can be used for the streaming media content and the second screen content (e.g., the main streaming could be on a personal computer and smart TV and the second screen content could be on a tablet computer or smart phone). More generally, both the media content and the second-screen content can be displayed across multiple platforms, including interactive/IP TVs, personal computers, console gaming devices, tablet devices, netbooks, laptops, and mobile phones, and all of these could be presented on these various devices whatever their operating system.

Still referring to FIG. 1, provided is an external social media interface server 130 for providing updates and otherwise interacting with external social media sites such as Facebook, LinkedIn, Google+, Pinterest and the like. The present implementation provides as an embodiment a tight integration with one or more of these external social media sites whereby any activity you are performing can be posted and integrated into your "wall" or other newsfeed. For example, if you invite your friends to watch a movie or are watching a movie with friends, there can be an "event" posted to your wall or newsfeed. Purchases can be shared as well as news items, which can help to drive additional content sales revenue. For example, the newsfeed item could include link to a trailer which would in turn provide an option to purchase the content through the service provider's website.

One possible social networking approach, which can be done through an external social network or one managed by the service provider directly to a social network of its customers, or some combination of the foregoing, is to allow a purchaser to send an "event" invitation to multiple of his or her social network connections whereby the system can schedule a social viewing for the multiple invitees who accept the invitation. The DRM server 114 in connection with the web server 108 or other described servers would be operable to manage the digital rights for the social viewing to ensure that only the permitted number of digital media download streams are provided.

As for the scheduling and payment for the social viewing, a possible approach would be to charge a certain fee that would include a multiple viewer license, such as including the ability to invite up to ten friends to do a scheduled, one-time social viewing. The scheduling server 117 is provided to communicate with the web server and external social media sites (servers 140) to facilitate the scheduling of an interactive group media stream or social viewing for a user's social network. At the end of the social viewing, the system is enabled to offer that one or more of the invited friends can purchase a similar license or even a regular DVD for shipment through traditional ground shipping, or of course to provide other possible promotional offers to the participants.

As with other embodiments described herein, the "ten friends" mentioned above for the schedule invitation is merely exemplary, and the number of invites could be a single invite, up to ten invites, up to 100 invites, or any other number according to the type of implementation considered. For example, the described system would further enable wide-scale events for purchase (revenue) purposes or for free (promotional) purposes. Thus, you could have a corporate sponsored "event" where hundreds or thousands of viewers could sign up for a live stream with commentary, second stream content, and/or gaming content or interaction. These hundreds or thousands of attendees could be by scheduled invitation, or it could be an "open" invitation.

As another example, for a motion picture hit there could be a public viewing of a "Director's Cut," in which the director could provide commentary between major themes of a playback and/or during the playback. Thus, for example, the showing could be scheduled for Sunday night at 6 pm (e.g., Central Time) and there could potentially be hundreds of thousands of viewers watching simultaneously.

There could be provided a competitive trivia contest on a second screen, and because of the synchronization enabled by the presently described embodiments, risks of someone trying to cheat the game (e.g., by communicating with someone on a slightly differently timed stream) would be substantially mitigated. Particular issues that the disclosed system solves with respect to syncing are differing latencies between viewers/clients and multiple bandwidth issues among the clients/viewers. The disclosed embodiments are capable not just of delaying playback in certain instances but actually increasing playback (compressing time) in order to let feeds that have gotten behind catch up. Further, when the system detects that playbacks have gotten out of synch, it could disable certain functionalities (e.g., real-time games) that would be greatly affected by the lack of sync. To facilitate the synchronization of the multiple users participating in the feed of the media content, there could be provided a feedback from each of the users' video or media players through internet communications whereby the primary media server 112 or mediation server 115 is able to speed up or slow down respective streams to the different players in order to facilitate the syncing or re-syncing of the connections according to the received feedback. It should be appreciated that although internet communications for this feedback loop has been described, this is a design choice and other communications methods (such as other wired networks, wireless phone networks, cable television networks, etc.) may be appropriate according to design considerations.

The disclosed systems are further enabled to implement an approach where a group of people all owning a license to a particular media title want to watch the content together but through the internet at different locations. Again, the present DRM server 114 and associated servers that are a part of the present service provider 102 would be operable to confirm the rights of each person in the group, and the scheduling server 117 would be operable to schedule a viewing by all of the users where they would be given a synchronized common media streaming experience.

In any of the above implementations, although a first user may initiate and schedule a social viewing experience, in certain embodiments any of the participating viewers may be able to control the playback or any other aspects of the social interaction around the playback. As far as other types of control, there could be moderator roles for the "chat" or other "second screen" or other type of function outside of the media playback. Further, the control could be open where any user can control at anytime (e.g., any user could pause the movie playback at anytime). Or the control could be serially passed from one user to another.

With further reference to FIG. 1, a mediation server 115 is shown interposed between the primary media server 112 and the gateway 104 to the internet. The mediation server 115 is operable to synchronize the media streams coming out of the primary media server 112 so the receiving parties (clients 106) all receive the media streams substantially in synchronicity. Although this streaming and synchronizing is shown as being formed by the collective activity of both servers 112, 115, this described embodiment should not detract from the generality of any claims that may issue from the present case, and the primary media server 112 may be a collection of servers or a cloud-based content delivery network (CDN) as previously discussed, further, the functionality of synchronization might be integrated into the primary media server 112 such that a separate mediation server 115 would not be not required.

By "substantially in synchronicity," as stated above, depending on the application, this phrase might mean synchronized within 5 minutes, 1 minute, 30 seconds, 5 seconds, or 1 second, depending on design needs. In particular, if certain chat features or game features are enabled, the clients should receive media streams synchronized in such a fashion that users all have about the same number of seconds to react to the film such as by responding to a trivia question in the same number of whole seconds (or not being off by more than 1 second) or not seeing "spoilers" in the chat window while friends are watching the movie with them. Thus, the need for synchronicity will depend on whether the lack of it would end up detracting from the features being employed by the users.

All of the foregoing functionality can be distributed amongst servers and/or vendors according to system design choices, and it is expressly contemplated that all of the described functionality can be incorporated into a single server, web server, and/or vendor hosting a server or servers, and by the same token all of the described functionality can be distributed amongst various servers, web servers, and/or vendors hosting multiple servers. The described divisions of servers can be physical or virtual divisions, and the various servers can be in the same or different physical locations.

Figure 2:
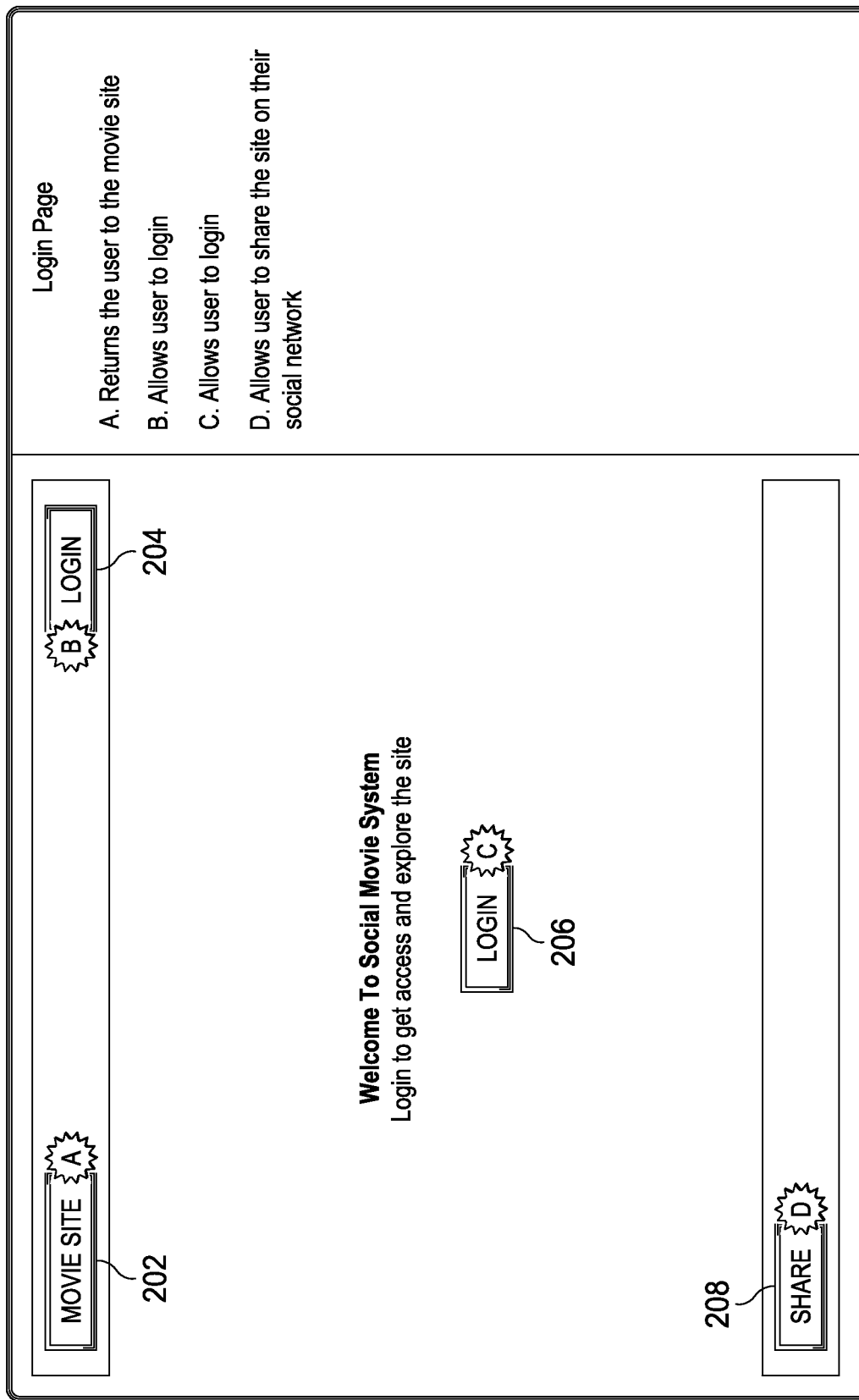
FIG. 2 is a screenshot of a landing site of an exemplary system such as the one set forth in FIG. 1.

Referring now to FIG. 2, provided here is an illustrative user interface screenshot for an exemplary embodiment system 100 as described above. The screenshot represents an example of what would be displayed on the client devices 106 of FIG. 1 through interaction of those client devices with the web server(s) 108. As set forth in FIG. 2, when a user is directed to this landing page for the service, such as from a movie site (e.g., www.next*big*movie.com) the user would be welcomed to a branded service site for the service described herein. In the present example, the service site is referred to generically as "social movie system," so the landing page simply says in this example "Welcome to Social Movie System." From this page, by the button 202 the user is given the option to return to the original movie site from which they came, or login (per buttons 204, 206) to begin interacting with the site with their personalized profile (as stored in the user profile database 110). Having the user login allows for the system to pull up the user profile and allows the users to make purchases and share (per button 208) their social movie system activities with their social networks. This login will further enable the scheduling of interactive movie viewing with the scheduling server 117 to enable the user to watch licensed media content in synchronized fashion with her friends.

Figure 3:
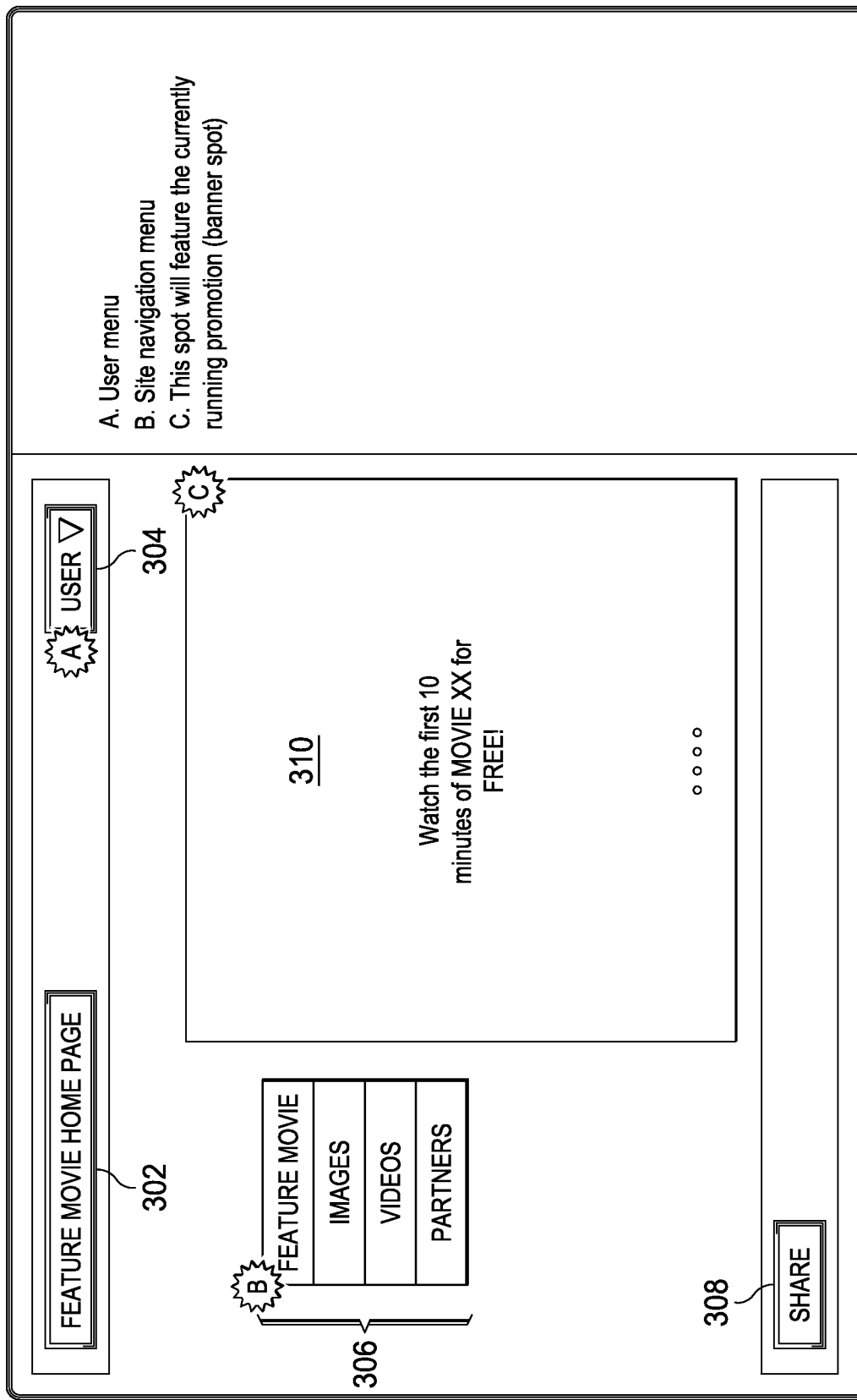
FIG. 3 is another screenshot of an exemplary system as described herein.

Referring now to FIG. 3, illustrated in this figure is an exemplary screenshot of the present system at a subsequent level from the landing site. In this version, in some instances, perhaps because a user had logged in although there could be other bases for advancing to this screen from the landing page, rotating movie promotional spots are being displayed in the center window 310. As an enticement for the user to click on one of these promotions, the user is being offered 10 minutes of free viewing of one of the movies being promoted. Of course, the amount of free viewing offered or even the type of promotion is merely exemplary and should not in any way be argued to limit the coverage of the claims to accused systems only having this same promotion offer.

Still referring to FIG. 3, and as previously described with respect to FIG. 2, a button 302 is provided to return the user to the original movie site or other originating site that directed the user to the site for the presently described system. In this case, there is also a button 304 that provides a user pull-down menu for user-oriented functions. Site navigation menus 306 are further provided to the left of the promotional window 310. These navigation menus 306 can take the user, for example, to a "feature movie" page that would include photos of scenes from the movie, social sharing features, purchasing options, and scheduling options whereby the user would be able to purchase a movie and schedule a social viewing for the movie with him and all his friends. Other options on the site navigation menu include image and video page buttons 306 that could have a number of thumbnails and would provide for "click through" and/or possible purchase of corresponding media or merchandise relating to the images. As with FIG. 2, a "share" button 308 is provided such that the user can share their activities with their social circles.

Figure 4:
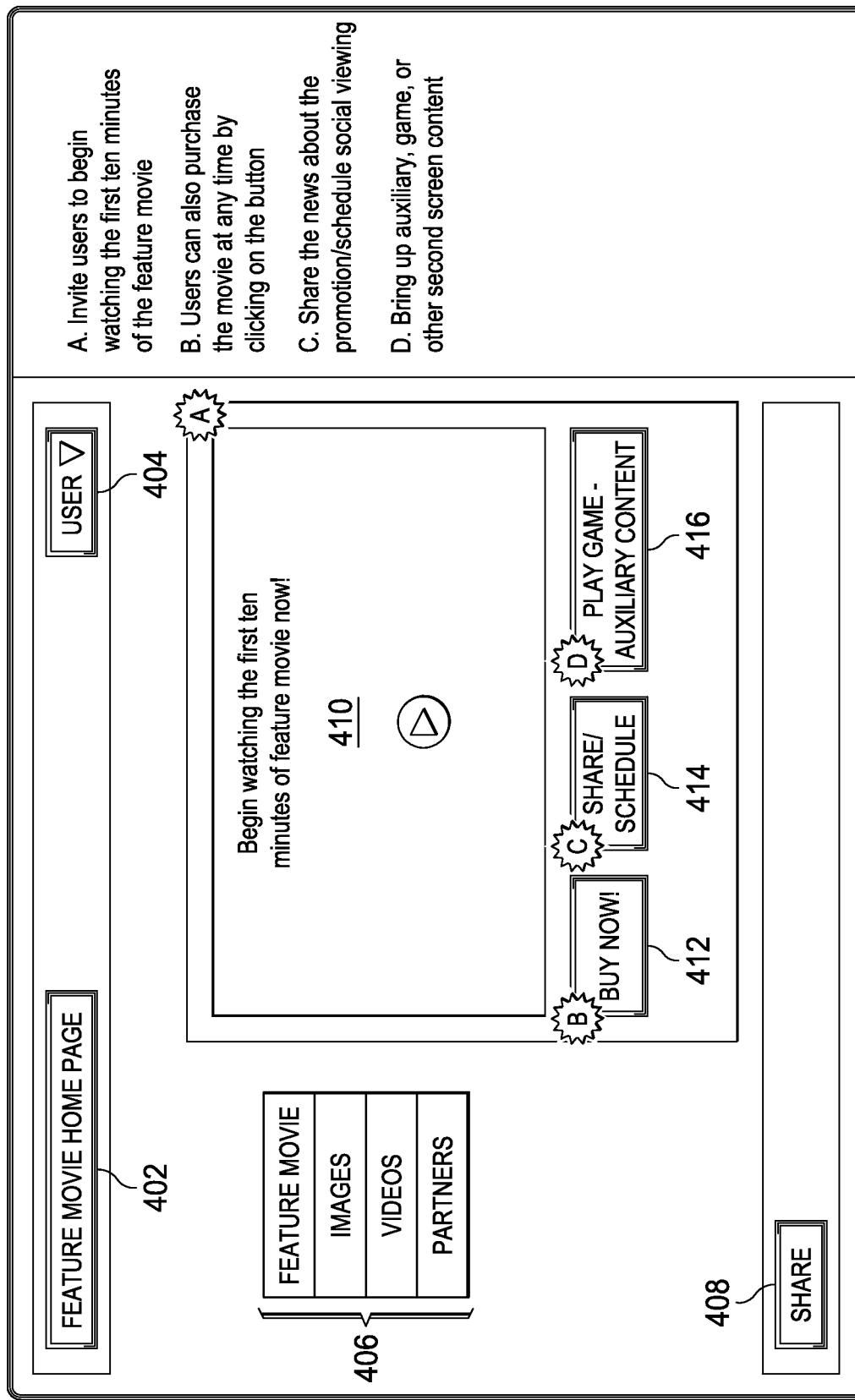
FIG. 4 is another screenshot providing for promotional viewing of a movie or other shared media content and inviting purchase of the content and social interaction around the content.

Referring now to FIG. 4, this figure has much in common with FIG. 3. The buttons referencing the feature move home page 402 and the user menu 404 would have similar functions to that described for the corresponding buttons with respect to FIG. 3. The navigation menus 406 and the "share" button 408 also have the same or similar function as was described for menus/button 306, 308 in FIG. 3. The new aspects illustrated in FIG. 4 relate to presenting a video player window 410, where the video player window 410 is now playing (again, as an example) the first 10 minutes of a movie to encourage purchase of the movie. New social buttons 412, 414, 416 are further provided beneath the video player window 410.

Still referring to FIG. 4, the new social buttons presented in this figure relate to actually purchasing the promotional content (by button 412), which as previously described would initiate a user purchase through the merchandise fulfillment server 150 (see FIG. 1). Also provided is a Share/Schedule button 414, which would interface with internal or external social media functions to invite or inform other users about the user's purchasing/viewing/sharing/scheduling of online media content. Disclosed embodiments herein provide via scheduling server 117 for the scheduling of multiple users to simultaneously watch and engage with each other during the remote screening of licensed media content while being in different physical locations through parallel media streaming. Further provided is the "auxiliary content" button 416, which brings up options for providing "second screen" content such as "Scene It?," IMDb, or similar movie review and information content, or other movie-oriented games, chat windows or any number of other possible second screen options.

Figure 5:
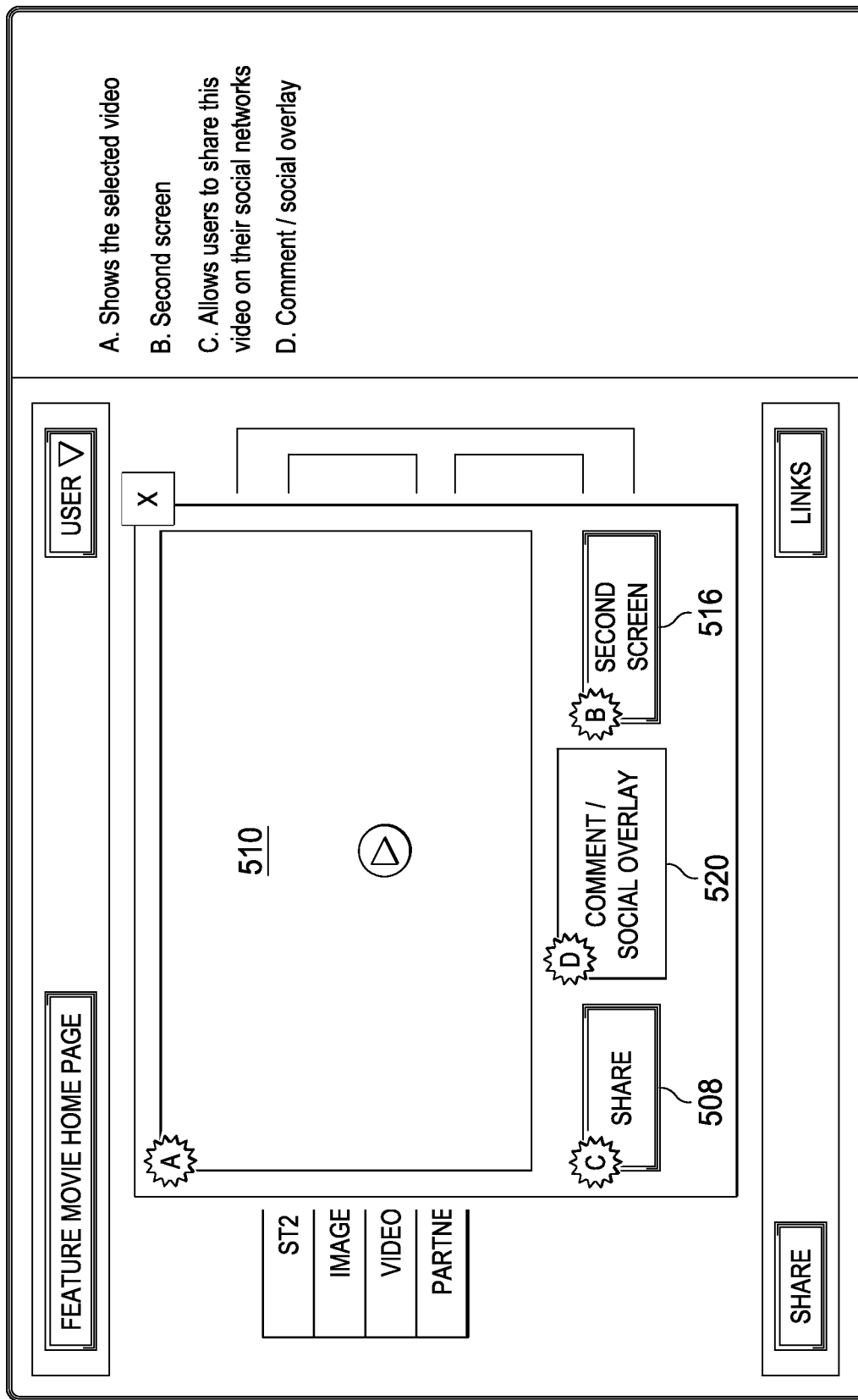
FIG. 5 is another screenshot providing an exemplary media content player (e.g., video player) that combines the playback screen along with time-contextual social interaction.

Referring now to FIG. 5, this figure provides an exemplary screenshot of a video player window 510 when the user has proceeded through purchasing or otherwise securing video rights to licensed content and is engaged in actually viewing the content. This video window would have video controls (e.g., play, fast-forward, rewind, stop, etc.) and could be enlarged compatibly with the display it was being played upon. As previously discussed, the video controls could be "open" such that any user could make a change to the video playback, or it could be "closed" such that only one user at a time could do so, but with another possible embodiment that a first master user could pass control to another user, and so forth.

The social elements in this figure are provided to fully engage the user with his or her friends and family that are watching the content with him or her. Specifically, as described in FIG. 4, there is a "second screen"" option button 516 to pull up additional information about the movie being watched, or to play games relating to the movie (e.g., "Scene It?" or other movie trivia or themed action games). There is also a "Share" button 508 on this screen to inform a user's social network of their activities, and as illustrated in this embodiment, the share button 508 has essentially been promoted from the screen behind the video screen that has been previously discussed.

Still referring to FIG. 5, there is provided a chat window 520 or other window for interacting with a user's friends who are watching the movie with the user. The present system also provides for marking/annotating the video images through marking tools or other devices, and through the indexing of the video content all of this interaction can be stored and recalled in certain embodiments through later viewings by the same or different system users who are in the original users' social circles and have been given rights to view the licensed content.

In other words, the recorded social viewing can be archived and played back complete with social interactions occurring during the original watching as if the later watcher of the content had been there observing in real-time. This feature allows for friends and family on another side of the world to still enjoy the conversation occurring around a scene and see the conversation in context of the parts of a movie that inspired the comments.

With respect to the discussion of video players, it should be noted that the means for providing these video players and second screen and other social interaction features can be accomplished by different means. One approach would be to embed a standard video player window as a frame within the web pages served through this system and provide for compatible synchronized content through a standard video player. Another approach would be to provide a customized player. The way the system would serve video to the system and combine second screen content could be effected according to the choices made in this regard. In other words, for "framed" content there could be established separate tunnels for delivering both original media and second screen content to the webpage. For a customized player, it would be possible (though not necessary) to combine the feeds at a server behind the firewall and provide them as a single stream to the customized player. One of ordinary skill in the art would be able to adapt the architecture according to system design needs along either of these paths.

In other words, and still referring to the video player design, some portions of the player functionality can be handled in servers provided by the overall service, whereas the players themselves can include embedded functionality to accomplish some of the features described above. Thus, various functionalities exist in the system 100 and can be distributed among different components within the system.

With further reference to the social interaction facilitated by the social overlay 520 and associated tools described with respect to FIG. 5, the presently described embodiments open very new ways of socially sharing the movie viewing experience even beyond those described for socially viewing a movie in real-time and remotely with friends and family. Because of the time-indexing and tracking capabilities of the present video system, the system provides an unprecedented ability to share screenshots and comments on favorite movie scenes with one's social circles, while watching the movie in real-time. Again, this type of social media sharing, particularly when coupled with links that can take social network contacts to a place to purchase referenced content, fundamentally provides excitement around media content available for license/sale. This functionality basically takes the time code of a movie and takes a snapshot or a clip of the film, sharing it with a user's social network, along with the user's commentary, reviews, or invitation to watch the movie with them or others at a social viewing event.

Figure 6:
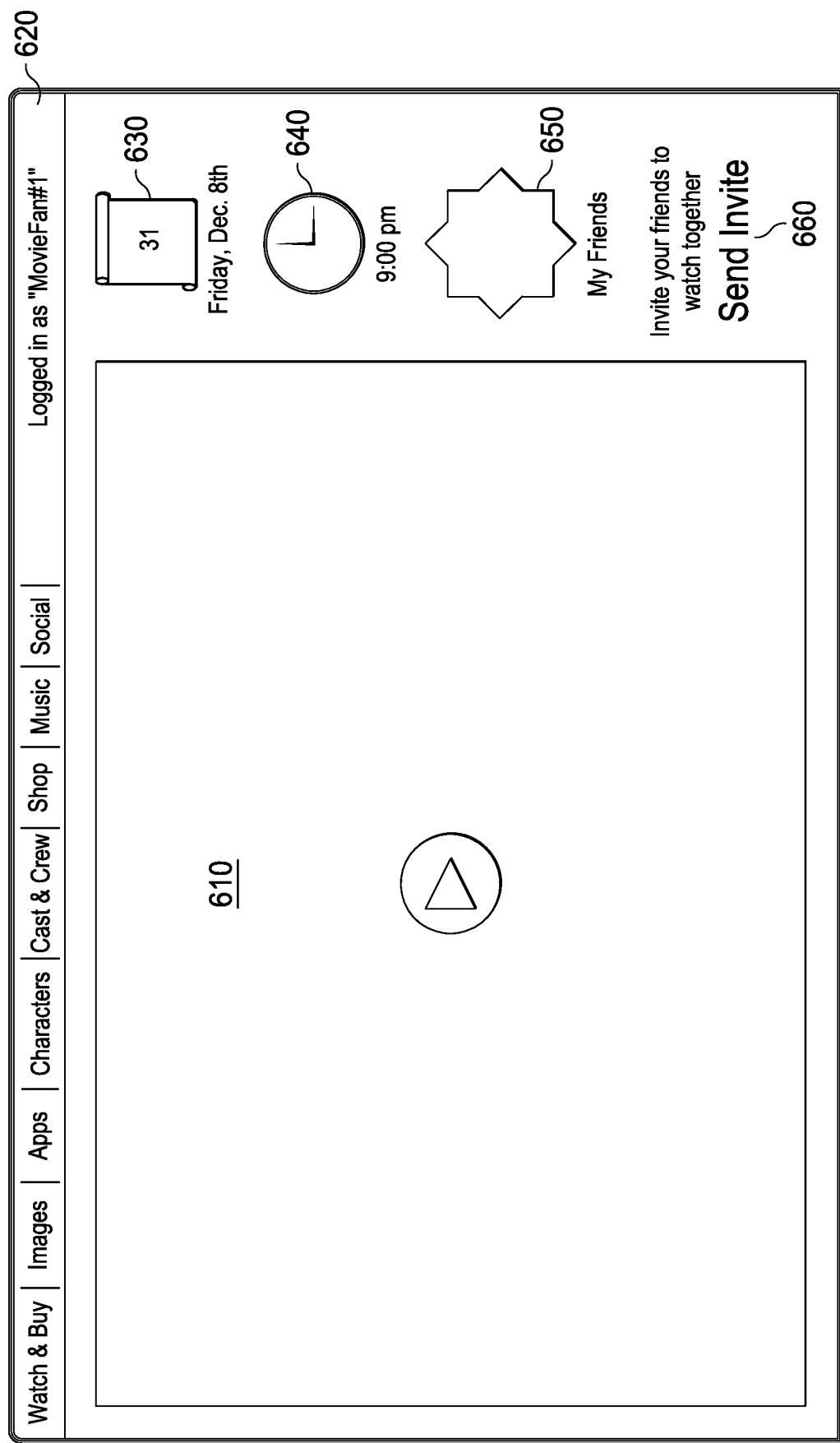
FIG. 6 is a screenshot illustrating the social viewing scheduling feature.

Referring now to FIG. 6, illustrated in this figure is an exemplary embodiment of the scheduling feature described herein. The screenshot here would be provided in an embodiment by the web server 108, and the scheduling information would be established and coordinated through the web server 108 by the scheduling server 117 (see FIG. 1). As previously discussed, there might at the same time be provided a player window 610 that could be illustrating a promotional video or actually be presently showing a regular, licensed media stream. Various other menu options are shown above as menu items 620. And the scheduling options provided include calendar 630, time 640, friends list 650, and send invite 660. In embodiments, the calendar 630 would provide the calendar date for the social viewing and the time 640 would be the time established for the social viewing (per a reference time zone, which would be adjusted according to the invited friends' time zones in order to provide a consistent invitation). Further, the "My Friends" button 650 may be a complete list of friends showing the status of all friends (invited, accepted, pending, etc.) for a given event, whereas the "Send Invite" button 660 might be to invite an existing friend or a presently unconnected friend known by their email or other online identification.

As to the various options shown for in the menu items 620, many of these have been previously discussed, but by way of quick summary the presented options in this embodiment are as follows:

a. "Watch & Buy"—Watch promotional portions of movies and be presented with options to purchase and schedule social viewing events.

b. "Images"—Get access to various image captures from movies and share those movie images with your social network, coupled with you and your network being able to use those images to establish and schedule viewing events.

c. "Apps"—Access and/or download various apps that may be second-screen coordinated with the social viewing events.

d. "Characters"—Gather social information around various movie characters and establish viewing events themed around those characters.
e. "Cast & Crew"—Limited screenings associated with movie releases. This could also be provided consistent with various promotions in which selected members of the general public would get access to the limited screenings. As previously described with respect to functions like a "Director's Cut" screening, the time-indexing of the presently described embodiments provide a heightened ability to provide in-depth background information in the context of the movie and as a part of the screening.
f. "Shop"—Shop for online or physical merchandise.
g. "Music"—Similar to the "Images" feature, allows users to share musical clips or songs from movies with their social networks, whereby the users can comment and interact around the song (and potentially metadata placing the song in context) and providing for a link that could return the social users back to the interactive movie site from where the songs came. As with the other described features, this interaction may lead to group watch scheduling either directly at the social site or back at the interactive movie site or both.
h. "Social"—Various social network connections all provided in a coordinated area of the system.
i. "Logged In"—The login area that gives a user access to their purchased content, friends list and the like, which may be provided through the user records stored in the user profile database 110 (see FIG. 1).

Figure 7:
FIG. 7 is a screenshot illustrating the synchronized user chat feature in more detail.

Referring now to FIG. 7, this figure illustrates in greater detail the social chat functionality. As previously described, there is a player window 710 and the above described menu options 720. The present figure also shows, however, a group of friends discussing a particular scene as that scene occurs in the movie. Prior video players have not been able to stream licensed content and allow multiple users to provide comments to each other while all users are seeing essentially the same scenes. Further, the present system allows for the archiving of the playback with commentary, such that one of the participants or another user in one of their social circles is able to at a later time view the licensed content and the comments left by their friends as in the same context (while the same scene is playing in the movie) that their friend made the comments. FIG. 7 also illustrates a "Current Viewers" bar 740 that shows who is presently watching a movie and gives an "<<invite>>" button to invite others to join.

With general reference to all of the figures described above and in general description of the features and functionalities described herein, the system described also includes functionality whereby either through second screen data or through superimposed data on the media player, popular scenes or images can be suggested to users for sharing through their social networks while the real-time video stream is being watched. Thus, during that live media viewing, a prompt could show up for the users to share an image or a song, and that image or song clip, and the user's commentary, can be posted to Facebook or another social media site.

As another specific embodiment for interacting with a social media site, there exist virtual "pinboards" on the internet as a means for socially interacting and posting pictures or links of interest and allowing your social network to further comment on them and add to the posts. One current such system is Pinterest (www.pininterest.com). The present system would allow for the posting of authorized movie images, along with official or unofficial metadata about the movies and/or particular movie scenes. With included hyperlinks, the social media site could take social network users directly, e.g., to movie landing pages and/or some of the webpages described in the present application whereby users can, for example, be given promotional offers, played portions of the movies relating to the image posted, and purchase and schedule social viewings.

The same real-time index information being synced with second screen type data enables the present system to show video clips of behind-the-scenes footage and alerting the consumer during real-time playback when such scenes are available. Thus on the primary or second screen there could be an alert (e.g., stoplight) letting the user know that behind-the-scenes footage is available. By this same token, second screen descriptive data can be synchronized to the video playback and contextually relevant information may be provided in this manner in described embodiments. Similarly, soundtrack and score information is also available in sync with the real-time movie play and can be made available for sale and/or sharing through social networks.

With further general reference to all of the embodiments described herein, it should be appreciated that the above-described chat features and/or second screen functionality can be implemented through the web server 108, or through the separate ancillary content server 125 or through another server. Further, the chat features, second screen features, metadata information feeds, or other additional functionality described herein can be implemented within or integrated within the video player itself and/or served through the media server 112 or mediation server 115. The described functionalities can be divided among hardware and software elements in various ways according to business or design needs, and such variations may remain within the scope of the claims to any patent issuing from the present application.

This application is a continuation application of U.S. application Ser. No. 18/813,913, which was filed on Aug. 23, 2024, which is a continuation application of U.S. application Ser. No. 18/508,152, which was filed on Nov. 13, 2023, issued as U.S. Pat. No. 12,075,130 on Aug. 27, 2024, which is a continuation application of U.S. application Ser. No. 17/888,425, which was filed on Aug. 15, 2022, issued as U.S. Pat. No. 11,818,417 on Nov. 14, 2023, which is a continuation application of U.S. application Ser. No. 15/290,218, which was filed on Oct. 11, 2016, issued as U.S. Pat. No. 11,418,845 on Aug. 16, 2022, which is a continuation application of U.S. application Ser. No. 14/665,693, which was filed on Mar. 23, 2015, issued as U.S. Pat. No. 9,674,239 on Jun. 6, 2017, which is a continuation application of U.S. application Ser. No. 13/756,444, which was filed on Jan. 31, 2013, issued as U.S. Pat. No. 8,990,303 on Mar. 24, 2015, all of which are incorporated herein by reference.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

As used in the disclosures and the appended claims, the terms "example embodiment," "exemplary embodiment," and "present embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on," and the terms "a," "an," and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations. Although various computer elements have been illustrated herein as single computer servers or machines, such elements may operate over several different physical machines, or they may be combined as operating code instances running on a single physical machine. The claims in the present application comprehend such variation in physical machine configurations.

Although various computer elements have been illustrated herein as single computer servers or machines, such elements may operate over several different physical machines, or they may be combined as operating code instances running on a single physical machine. The claims in the present application comprehend such variation in physical machine configurations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s), and their equivalents, that are protected thereby. In all instances, the scope of such claims shall be considered on their own merits in light of this disclosure, but should not be constrained by the headings herein.

What is claimed is:

1. One or more systems for providing at least partially synchronized streaming and enabling modifying the at least partially synchronized streaming, the one or more systems comprising:

at least one server, in communication with a user profile database, and operable to:

communicate, over a network, with one or more client devices connected to Internet;

enable a first user to share a link associated with at least partially synchronized streaming of a media stream, wherein the sharing of the link enables one or more users associated with the one or more client devices to join the at least partially synchronized streaming of the media stream, wherein the sharing of the link occurs during when the first user or a second user is receiving the media stream;

provide or transmit the media stream to the one or more client devices such that the media stream is displayed, in an at least partially synchronized manner, on one or more display screens of the one or more client devices;

enable the one or more users associated with the one or more client devices to interact using the one or more client devices such that user interactions are exchanged using the one or more client devices at least partially simultaneously with display of the media stream on the one or more display screens of the one or more client devices, and such that the user interactions are displayed at least partially simultaneously with the media stream on the one or more display screens of the one or more client devices;

enable the first user or the second user to add a visual indicator on or to the media stream or in the user interactions such that the visual indicator added on or to the media stream or added in the user interactions is viewable by the one or more users associated with the one or more client devices;

receive a first instruction from a third user to assign to or share with the second user, a first control: of the at least partially synchronized streaming of the media stream, or of the user interactions displayed at least partially simultaneously with the media stream;

in response to receiving the first instruction from the third user to assign to or share with the second user, the first control: of the at least partially synchronized streaming of the media stream, or of the user interactions displayed at least partially simultaneously with the media stream, enable the second user to control: the at least partially synchronized streaming of the media stream for a fourth user receiving the media stream, or the user interactions displayed at least partially simultaneously with the media stream to the fourth user receiving the media stream; and receive a second instruction from the second user to modify the at least partially synchronized streaming of the media stream or the user interactions displayed at least partially simultaneously with the media stream, thereby causing the at least partially synchronized streaming of the media stream, or the user interactions displayed at least partially simultaneously with the media stream, to be modified for the fourth user, wherein an ancillary content server or the at least one server provides ancillary content to a first client device, and wherein the ancillary content is presented on the first client device.

2. The one or more systems of claim 1, wherein the at least one server is operable to schedule the providing or transmitting of the media stream to the one or more client devices in response to a user request to schedule a multi-user shared experiencing of the media stream.

3. The one or more systems of claim 1, wherein at least one of the user interactions at least partially overlap with the media stream, or the user interactions comprise at least one of an audio-based user interaction or a video-based user interaction.

4. The one or more systems of claim 1, wherein the media stream comprises video content and audio content.

5. The one or more systems of claim 1, wherein the at least one server is further operable to enable the first user to share the link associated with the at least partially synchronized streaming of the media stream with a social network of the first user.

6. The one or more systems of claim 1, wherein the user interactions are indexed with the media stream such that the user interactions are viewable with the media stream, on a computing device different from at least one of the one or more client devices, during a future streaming of the media stream.

7. The one or more systems of claim 1, wherein the at least partially synchronized streaming of the media stream is implemented in part by receipt of one or more synchronization feedback signals from the one or more client devices.

8. The one or more systems of claim 1,
wherein separate paths are provided for a first transmission of the media stream and a second transmission of the ancillary content, or
wherein at least a first portion of a first transmission path of the media stream is different from at least a second portion of a second transmission path of the ancillary content.

9. The one or more systems of claim 1, wherein the ancillary content is associated with or customized for at least one of: the first user, the second user, the third user, or the fourth user.

10. A method for providing at least partially synchronized streaming and enabling modifying the at least partially synchronized streaming, the method comprising:

communicating, by at least one server, over a network, with one or more client devices connected to Internet;

enabling, by the at least one server, a first user to share a link associated with at least partially synchronized streaming of media content, wherein the link enables one or more users associated with the one or more client devices to join the at least partially synchronized streaming of the media content, wherein the sharing of the link occurs during when the first user or a second user is receiving the media content;

providing or transmitting, by the at least one server, the media content to the one or more client devices such that the media content is displayed, in an at least partially synchronized manner, on one or more display screens of the one or more client devices;

enabling, by the at least one server, the one or more users associated with the one or more client devices to interact using the one or more client devices such that user interactions are exchanged using the one or more client devices at least partially simultaneously with display of the media content on the one or more display screens of the one or more client devices, and such that the user interactions are displayed at least partially simultaneously with the media content on the one or more display screens of the one or more client devices;

enabling, by the at least one server, the first user or the second user to add a visual indicator on or to the media content or in the user interactions such that the visual indicator added on or to the media content or added in the user interactions is viewable by the one or more users associated with the one or more client devices;

receiving, by the at least one server, a first instruction to assign to or share with the second user, a first control: of the at least partially synchronized streaming of the media content, or of the user interactions displayed at least partially simultaneously with the media content;

in response to receiving the first instruction to assign to or share with the second user, the first control: of the at least partially synchronized streaming of the media content, or of the user interactions displayed at least partially simultaneously with the media content, enabling, by the at least one server, the second user to control: the at least partially synchronized streaming of the media content for a third user receiving the media content, or the user interactions displayed at least partially simultaneously with the media content to the third user receiving the media content; and receiving, by the at least one server, a second instruction from the second user to modify the at least partially synchronized streaming of the media content or the user interactions displayed at least partially simultaneously with the media content, thereby causing the at least partially synchronized streaming of the media content, or the user interactions displayed at least partially simultaneously with the media content, to be modified for the third user, wherein an ancillary content server or the at least one server provides ancillary content for transmission to a first client device, and wherein the ancillary content is presented on the first client device.

11. The method of claim 10, further comprising scheduling, by the at least one server, the providing or transmitting of the media content to the one or more client devices in response to a user request to schedule a multi-user shared experiencing of the media content.

12. The method of claim 10, wherein the media content comprises an at least partially real-time media stream.

13. The method of claim 10, wherein the one or more client devices comprise at least one mobile device.

14. One or more systems for providing at least partially synchronized streaming and enabling manipulating the at least partially synchronized streaming, the one or more systems comprising:
  means for communicating, over a network, with one or more mobile client devices;
  means for enabling a first user to share a link associated with at least partially synchronized streaming of a media stream, wherein the link enables one or more users associated with the one or more mobile client devices to join the at least partially synchronized streaming of the media stream, wherein the sharing of the link occurs during when the first user or a second user is receiving the media stream;
  means for providing or transmitting the media stream to the one or more mobile client devices such that the media stream is displayed, in an at least partially synchronized manner, on one or more display screens of the one or more mobile client devices;
  means for enabling the one or more users associated with the one or more mobile client devices to interact using the one or more mobile client devices such that user interactions are exchanged using the one or more mobile client devices at least partially simultaneously with display of the media stream on the one or more display screens of the one or more mobile client devices, and such that the user interactions are displayed at least partially simultaneously with the media stream on the one or more display screens of the one or more mobile client devices;
  means for enabling the first user or the second user to add a visual indicator on or to the media stream or in the user interactions such that the visual indicator added on or to the media stream or added in the user interactions is viewable by the one or more users associated with the one or more mobile client devices;
  means for receiving a first instruction to assign to or share with the second user, a first control: of the at least partially synchronized streaming of the media stream, or of the user interactions displayed at least partially simultaneously with the media stream;
  in response to receiving the first instruction to assign to or share with the second user, the first control: of the at least partially synchronized streaming of the media stream, or of the user interactions displayed at least partially simultaneously with the media stream, means for enabling the second user to control: the at least partially synchronized streaming of the media stream for a third user receiving the media stream, or the user interactions displayed at least partially simultaneously with the media stream to the third user receiving the media stream;
  means for receiving a second instruction from the second user to manipulate the at least partially synchronized streaming of the media stream or the user interactions displayed at least partially simultaneously with the media stream, thereby causing the at least partially synchronized streaming of the media stream, or the user interactions displayed at least partially simultaneously with the media stream, to be manipulated for the third user; and
  means for providing ancillary content to a first client device such that the ancillary content is displayed on the first client device.

15. The method of claim 10, wherein at least one of: the user interactions do not at least partially overlap with the media content, or the user interactions comprise at least one of an audio-based user interaction or a video-based user interaction.

16. The method of claim 10, wherein at least one of: the ancillary content server provides the ancillary content for the transmission to the first client device, or the ancillary content is associated with or customized for at least one of: the first user, the second user, or the third user.

17. The method of claim 10, wherein the first control or the second instruction comprises at least one a rewind function, a fast forward function, a stop function, or a play function.

18. The method of claim 10, wherein the first control or the second instruction comprises a moderation operation associated with the user interactions.

19. The method of claim 18, wherein the media content comprises an at least partially real-time media stream.

20. The method of claim 10, wherein after the first control is assigned to or shared with the second user, only the second user, and not a fourth user, is enabled to control: the at least partially synchronized streaming of the media content for the third user receiving the media content, or the user interactions displayed at least partially simultaneously with the media content to the third user receiving the media content.

21. The method of claim 10, wherein after the first control is assigned to or shared with the second user, both the second user and a fourth user are enabled to control: the at least partially synchronized streaming of the media content for the third user receiving the media content, or the user interactions displayed at least partially simultaneously with the media content to the third user receiving the media content.

22. The method of claim 10, wherein the first control or the second instruction comprises a modification operation.

23. The method of claim 10, wherein the first control or the second instruction comprises at least one of an edit operation, or add operation, or a removal operation.

24. The method of claim 10, wherein the first control or the second instruction comprises a user or user interaction removal operation.

25. The method of claim 10, wherein the first control or the second instruction comprises a user or user interaction modification operation.

26. The method of claim 10, wherein a first delay exists between first media content display of the media content to a fourth user and the first media content display of the media content to a fifth user, or wherein a second delay exists between second media content display of the media content on a second client device associated with the third user and first user interactions display of the user interactions on the second client device associated with the third user.

27. The method of claim 10, wherein at least one of:
  the visual indicator is added: on or to the media content, or in the user interactions,
  the visual indicator is added: on or to the media content, or in the user interactions, using a marking tool, or the user interactions at least partially overlap with the media content.

28. The method of claim 10, further comprising:

receiving, by the at least one server, a third instruction to assign to or share with the second user, a second control of second ancillary content displayed to the third user; and in response to receiving the third instruction to assign to or share with the second user, the second control of the second ancillary content displayed to the third user, enabling, by the at least one server, the second user to control the second ancillary content displayed to the third user.

29. The method of claim 10, wherein the media content is customized for at least one of: the first user, the second user, or the third user, and wherein second ancillary content or a second media content displayed to the third user is controllable or customizable by the third user.

30. The method of claim 10, further comprising recording the at least partially synchronized streaming of the media content, including the visual indicator and the user interactions, for later replay.

* * * * *